(12) United States Patent
Mezan

(10) Patent No.: US 6,367,741 B2
(45) Date of Patent: Apr. 9, 2002

(54) FLIGHT CONTROL SYSTEM FOR A ROTARY-WING AIRCRAFT, PARTICULARLY FOR A HELICOPTER

(75) Inventor: Serge Mezan, Sausset-les-Pins (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/734,641

(22) Filed: Dec. 13, 2000

(30) Foreign Application Priority Data

Dec. 16, 1999 (FR) .............................................. 99 15875

(51) Int. Cl.⁷ .............................................. B64C 13/06
(52) U.S. Cl. ...................... 244/195; 244/75 R; 244/194
(58) Field of Search .............. 244/75 R, 76 R, 244/17.13, 194, 195, 196, 197; 703/3, 4, 8, 11

(56) References Cited

U.S. PATENT DOCUMENTS

| | | | |
|---|---|---|---|
| 4,168,045 A | * | 9/1979 | Wright et al. |
| 4,492,907 A | | 1/1985 | Fabian et al. |
| 5,141,177 A | * | 8/1992 | Wright et al. |
| 5,310,136 A | | 5/1994 | Fowler et al. |
| 5,428,543 A | * | 6/1995 | Gold et al. |
| 5,738,310 A | * | 4/1998 | Rollet et al. |
| 5,863,012 A | * | 1/1999 | Rollet et al. |
| 6,070,829 A | * | 6/2000 | Bellera et al. |

FOREIGN PATENT DOCUMENTS

FR  2756252  5/1998

OTHER PUBLICATIONS

French Preliminary Research Report and Annex (in French), Sep. 14, 2000.

* cited by examiner

*Primary Examiner*—Charles T. Jordan
*Assistant Examiner*—T. Dinh
(74) *Attorney, Agent, or Firm*—Stevens, Davis, Miller & Mosher, LLP

(57) ABSTRACT

Flight control system for a rotary-wing aircraft, particularly for a helicopter.

The flight control system comprises at least one flight control (LCo, MCy, Pal), first commands being representative of the position of a flight control (LCo, MCy, Pal), an assisted flight control system (CDVE) generating assistance values representing second commands, first unit (CDVE) for determining the control commands from the sum of the first and second commands, and a limitation system (SL) which limits the assistance values to first limited values. This limitation system (SL) additionally comprises unit for calculating the difference between the assistance values and the first limited values, and unit for calculating the sum of the first limited values and of difference and for transmitting it as second commands.

9 Claims, 2 Drawing Sheets

FLIGHT CONTROL SYSTEM FOR A ROTARY-WING AIRCRAFT, PARTICULARLY FOR A HELICOPTER

BACKGROUND OF THE INVENTION

The present invention relates to a flight control system for a rotary-wing aircraft, particularly for a helicopter.

It is known that in a helicopter which has no assisted flight control system such as, for example, an electric flight control device (CDVE) or an automatic pilot, there is a correspondence between, on the one hand, the position of the flight controls, for example the collective pitch lever, the cyclic pitch stick or the rudder, which can be actuated by a pilot of the aircraft and, on the other hand, the axis command applied to the helicopter rotor(s) in response to actuation of at least one of said flight controls. This correspondence allows the pilot to estimate in particular what proportion of control he still has along each axis. This estimate is generally used by the pilot to evaluate his margin for maneuver.

By contrast, when the helicopter is equipped with an assisted flight control system of the aforementioned type, which has an action on helicopter stability, on the decoupling or on the adherence to flight parameters such as attitude or heading, the aforementioned correspondence is no longer present, as specified hereinbelow.

Thus, for example, in the case of a helicopter equipped with an automatic pilot, a jack is generally mounted in the control linkage and receives commands from said automatic pilot, these being added to the commands representative of the position of the flight controls. In consequence, the position of said flight controls no longer corresponds directly to the axis command applied to the rotor(s). This axis command is in fact in this case the result of the sum of the commands representing the position of the flight controls and of the commands generated by said automatic pilot.

A similar situation is encountered in an aircraft equipped with an electrical flight control device (CDVE). In this case, a computer replaces the aforementioned linkage and jack and formulates an overall axis control command including the commands from the pilots and the commands from the assisted control device.

Current evolutions in flight control systems are tending to exacerbate the aforementioned problem because, particularly for safety and flight quality reasons, the assisted flight control systems such as the aforementioned ones are having an increasing influence and benefit, thus requiring an increasing amount of authority. This actually entails being able to generate higher authority than is currently used in conventional equipment.

DESCRIPTION OF THE PRIOR ART

So, in order to be able to give the aircraft pilot feedback regarding the control margin remaining on each of the flight controls, document FR-2 756 252 discloses a flight control system for a rotary-wing aircraft, particularly for a helicopter, equipped with an assisted flight control system, which, in a simple and precise way, allows the pilot to be at least partially provided with feedback regarding said control margins left on the various flight controls while at the same time acknowledging the flight control assistance afforded by said assisted flight control system.

To achieve this, that known flight control system comprises:

at least one flight control which can be moved between extreme positions by a pilot of said aircraft, first commands being representative of the position of said flight control;

an assisted flight control system generating assistance values representing second commands;

first means for determining control commands for at least one rotor of the aircraft from the sum of said first and second commands, and a limitation system associated with said assisted flight control system and comprising a limiter which is intended to limit said assistance values according to the position of said flight control, to limited values (transmitted to said first means as second commands) so that, particularly when said flight control is brought near to one of said extreme positions, said limited values are zero and therefore said control commands approximately correspond to said first commands.

Thus, by virtue of this known flight control system:

the pilot can ascertain the control margin remaining for the positions of the flight control, for which this information is important, namely essentially for positions close to said extreme positions; and the flight control assistance (that is to say the assistance afforded in the form of said second commands) is acknowledged to the greatest possible extent, that is to say particularly when the remaining control margin is sufficient for the pilot not to have precise feedback on it.

However, in the case of a flight control system such as this comprising a system for limiting the authority, a problem is encountered when the boundaries limiting the authority are reached, because at said boundaries, there is an abrupt change from a control law incorporating the flight control assistance (when the second commands are not limited) to a "pseudo-direct" control law with no stabilization (with second commands limited so that the control commands then correspond exclusively to said first commands increased by the value of said limit on the second commands, which depends on the position of the control) and with a different feel, and vice versa. The transition at said boundaries of the limit of authority is therefore far too abrupt, which in particular leads to problems of flying comfort and accuracy.

SUMMARY OF THE INVENTION

The object of the present invention is to overcome these drawbacks. The present invention relates to a flight control system comprising a limitation system which makes it possible to bring about a damped transition at the boundaries of the limit of authority generated by said limitation system.

To this end, according to the invention, said flight control system of the type particularly comprising:

at least one flight control which can be moved by a pilot of said aircraft, first commands being representative of the position of said flight control;

an assisted flight control system generating assistance values representing second commands;

a limitation system associated with said assisted flight control system and comprising a limiter which is intended to limit said assistance values according to the position of said flight control, to first limited values; and first means for determining said control commands from the sum of said first and second commands, is noteworthy in that said limitation system additionally comprises:

second means for determining damping values representative of the difference between said assistance values and said first limited values; and third means for calculating second limited values corresponding to the sum of said first limited values and of said damping values, and for transmitting the second limited values thus calculated as second commands to said first means.

Thus, as far as the assistance afforded by said assisted flight control system and limited by said limiter is concerned, a supplement obtained from the difference between the overall assistance control (assistance values) and said limited assistance control (first limited values) is superposed by virtue of the invention on the limited assistance control (first limited values), which makes it possible to damp the transition in the control commands at the boundaries of the limit of authority generated by said limitation system.

This damping is performed according to the amplitude and, as will be seen below, the dynamics of the assistance (assistance values) determined by the assisted flight control system.

In consequence, the present invention makes it possible, in the medium term (and to within the dynamics of said control supplement), to provide a solution to the problem of providing feedback regarding the proportion of axis control remaining, while at the same time improving the continuity and significance of the assistance, at the boundaries of the limit of authority.

Advantageously, said second means comprise:
a calculation means which calculates the difference between said assistance values and said first limited values; and
a filtering means which filters this difference to remove the low-frequency signals from it so as to obtain said damping values, which allows the dynamic part of the control supplement to be acknowledged.

It will be noted that the time constant of said filtering means determines the significance of the damping of the limit of authority.

As a preference, said limiter is formed in such a way as to limit the assistance values, by continuous limitation functions, generating minimum limitation when said flight control is brought near to its central position, and maximum limitation when said flight control is brought near to one of its extreme positions.

In addition, in order to optimize the efficiency of the present invention, at least some of said limitation functions may advantageously have variable values dependent on the value of parameters, such as the angular velocity of the aircraft, for example, which can be measured thereon.

Moreover:
when the aircraft is equipped with an automatic pilot, said assisted flight control system preferably corresponds to said automatic pilot of the aircraft; and
when the aircraft is fitted with an electrical or optical flight control device, said assisted flight control system and said limitation system are preferably incorporated into said flight control device.

BRIEF DESCRIPTION OF THE DRAWINGS

The figures of the appended drawing will make it easy to understand how the invention may be achieved. In these figures, identical references denote similar elements.

DESCRIPTION OF THE PREFERRED EMBODIMENTS

Figure 1:
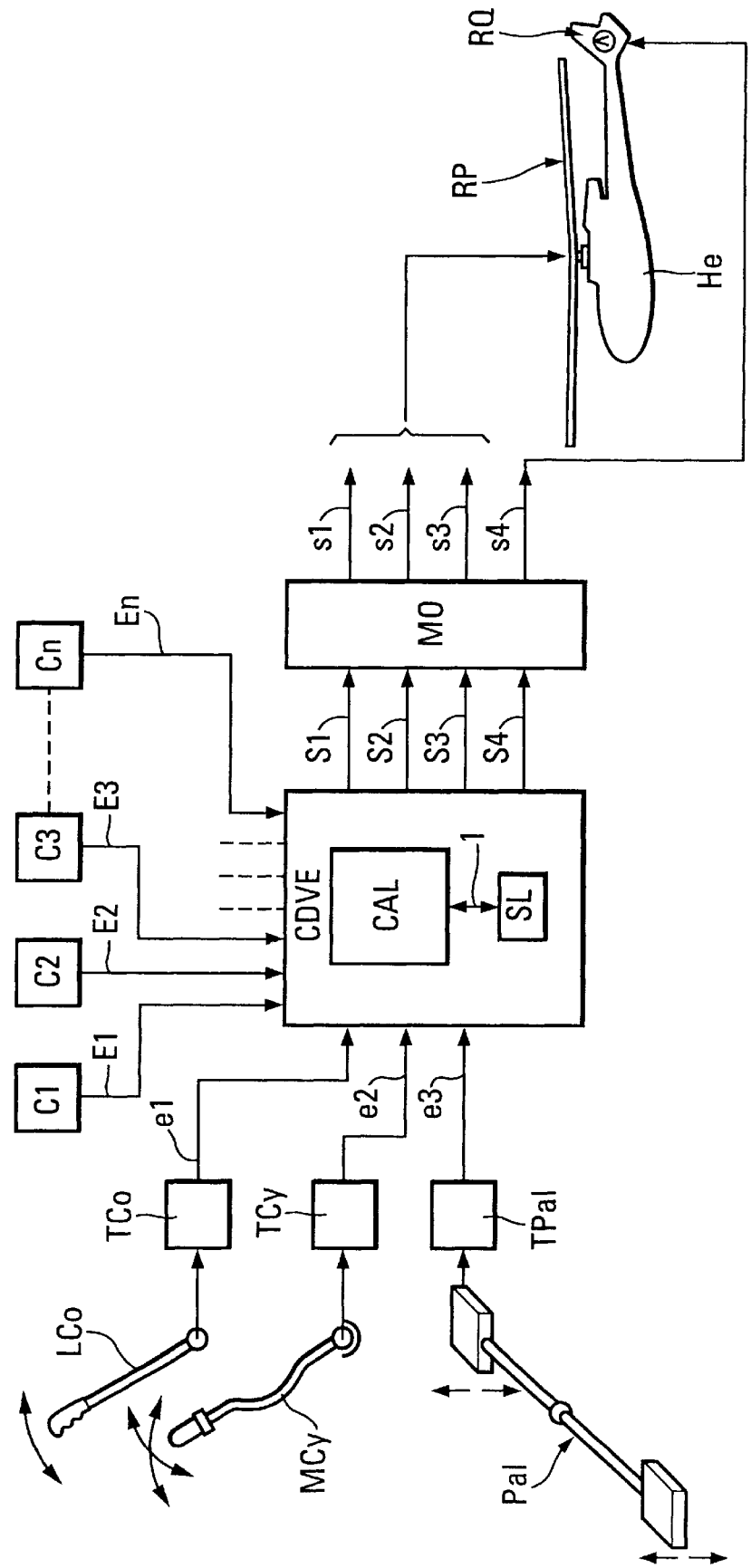
FIG. 1 is a synoptic diagram of a flight control system according to the invention, mounted on a helicopter equipped with an electrical flight control device.

Said flight control system according to the invention and depicted diagrammatically in FIG. 1 is mounted on board a rotary-wing aircraft, in this particular instance a helicopter He that is to be flown, although, for drawing clarity reasons, the helicopter He has been depicted on a small scale, outside said flight control system in this FIG. 1. In the example depicted, the helicopter He has a main rotor RP intended to provide lift and forward travel, and a tail rotor RQ intended to provide balance and control the yawing of the helicopter He.

This exemplary embodiment of the flight control system for a helicopter, shown diagrammatically in FIG. 1, comprises an electrical flight control device CDVE receiving a quantity of information and emitting control commands. For this purpose, in the example depicted, the following are associated in the known way with said device CDVE:
a collective pitch lever LCo, associated with a transducer TCo converting the movements of said lever into an electrical signal sent to the device CDVE by a link e1;
a cyclic pitch stick MCy, associated with a transducer TCy, converting movements of said stick into an electrical signal sent to the device CDVE by a link e2;
a rudder Pal, associated with a position sensor TPal converting the movements of said rudder into an electrical signal sent to the device CDVE by a link e3;
a number $\underline{n}$ of sensors C1 to Cn, mounted on board the helicopter and, in the form of electrical signals, delivering a quantity of information regarding the status of said helicopter He, such as the air speed, angular velocities, angular accelerations, attitude, load factors, etc., said information being sent to the device CDVE by the links E1 to En; and
a command combiner MO receiving, via links S1 to S4, the control commands formulated by the device CDVE from the signals sent by the links e1 to e3 and E1 to En, as specified hereinbelow, and sending control commands via links s1 to s3 to the servocontrols of the main rotor RP and, via the link s4, to the servocontrol of the tail rotor RQ. Although this has been depicted independently in FIG. 1, for the purpose of simplifying the drawing, said command combiner MO is generally incorporated into said electrical flight control device CDVE.

In the known way, said electrical flight control device CDVE determines, using a built-in algorithm illustrated by a calculation means CAL, the control commands for said rotors RP and RQ, acknowledging simultaneously:
information representing the respective positions of the aforementioned controls, namely the collective pitch lever LCo, the cyclic pitch stick MCy and the rudder Pal, which can be actuated by a pilot of the helicopter He; and
information delivered by the sensors C1 to Cn relating to the status of said helicopter He.

Thus formed, the device CDVE constitutes an assisted flight control system because, when calculating the control commands, it acknowledges not only the flight commands generated by the pilots, but also the actual status of the helicopter and in consequence determines optimized control commands which differ from the commands given by the pilots via the flight controls, this being in particular with a view to stabilizing the helicopter He and to optimizing the adherence to parameters, such as heading for example (or alternatively attitude, speed, etc.).

In addition, in order to allow the pilot to estimate the control margin remaining on each flight control, the device CDVE comprises a limitation system SL incorporated into and associated with said calculation means CAL, as illustrated by a link 1.

Said limitation system SL comprises a limiter 3 which is intended to limit the importance of the information calculated from the sensors C1 to Cn and relating to the status of the helicopter He in the control commands applied to the rotors RP and RQ according to the position of the flight controls LCo, MCy and/or Pal.

More specifically, although not exclusively:
- in the areas of control or of movement of said flight controls LCo, MCy and Pal, for which awareness of the axis control margins remaining is important, if not to say essential, to flight control (that is to say essentially at the extreme positions of said flight controls), said limiter 3 performs maximum limitation on the commands relating to information regarding the status of the helicopter He so as to obtain correspondence between the positions of said flight controls LCo, MCy and Pal and the respective axis controls applied to the rotors RP, RQ: whereas
- in the other areas of control, particularly in the areas of control where flight control assistance is needed (particularly for central positions of the flight controls), said limiter 3 performs minimum limitation so that the flight control system acknowledges the flight control assistance provided to the greatest possible extent.

Thus, whenever necessary, precise and effective feedback on the control margins remaining is provided, while at the same time acknowledging as much as possible the flight control assistance afforded by said assisted flight control system CDVE.

To simplify and sum up, said flight control system determines the control commands for each of the axes of control of the rotors RP and RQ of the helicopter He, namely respectively for flight control in terms of collective pitch, roll, yaw and pitch, from:
- first commands representative of the position of said flight controls. To do this, FIG. 2, in a simplified and schematic way, merely represents that part of the flight control system that applies to roll control, therefore merely represents the cyclic pitch stick MCy which can be moved sideways to control roll. Of course, the features of the invention which are specified hereinbelow in respect of roll control are also valid for control in terms of collective pitch, yaw and pitching; and
- second commands relating to assistance values which are limited by the limiter 3 to first limited values.

Said first and second commands are transmitted, via links e2 and e2A respectively, to a summing means 2 which sums said commands and sends the results via a link si to the servocontrols for the main rotor RP, via the command combiner, controlling the rolling of the helicopter He.

Figure 2:
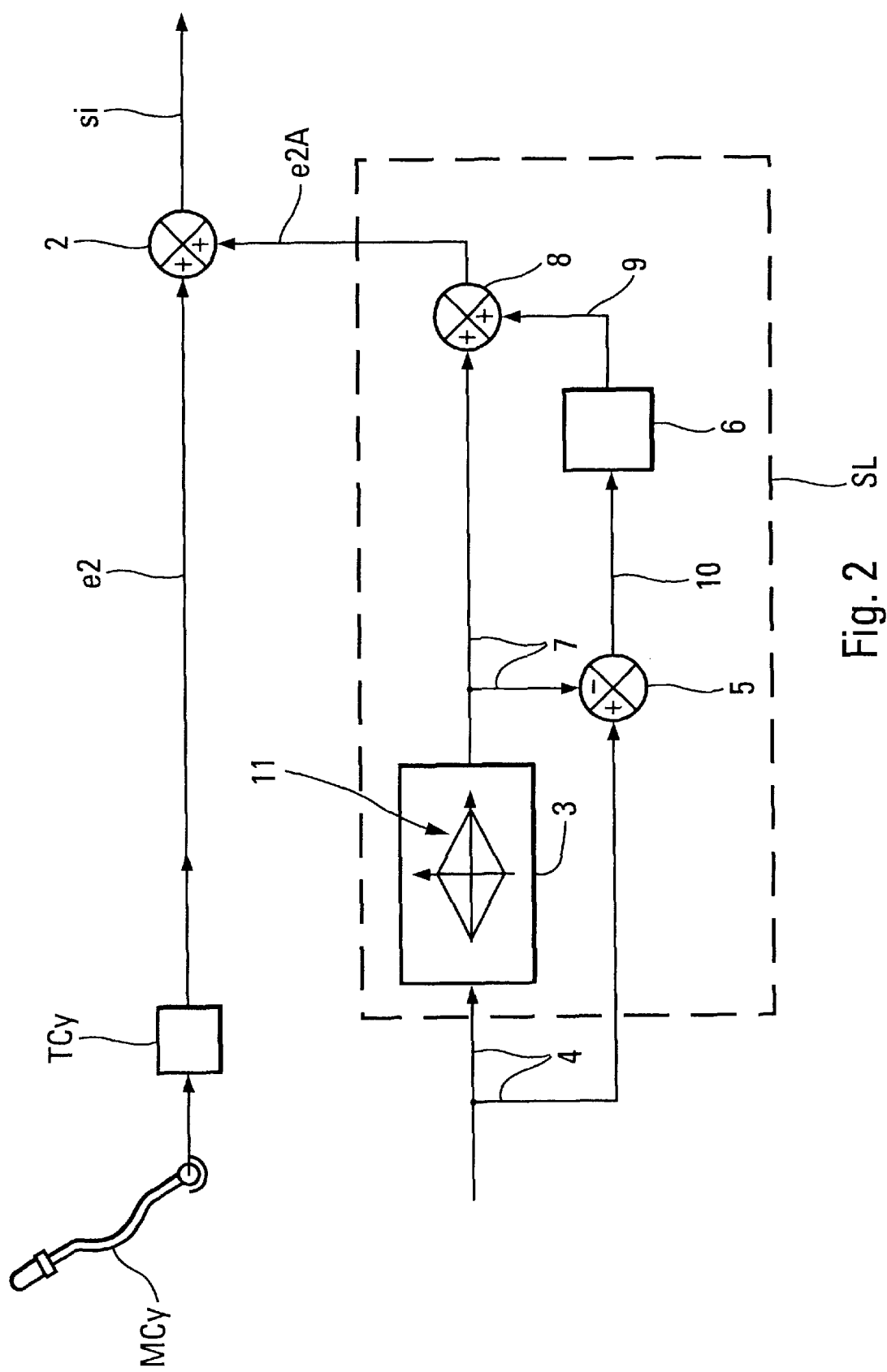
FIG. 2 diagrammatically illustrates a limitation system according to the invention and relating to just one control axis of a flight control system.

According to the invention, said limitation system SL which, as depicted in FIG. 2, comprises the limiter 3 which, in the way described hereinbelow, limits the assistance values (received via a link 4 from the assisted flight control system and intended in particular to stabilize the aircraft), additionally comprises, in order to damp the transition at the boundaries of the limitation it generates:
- means 5, 6 for determining the damping values representative of the difference between said assistance values received by the duplicated link 4 from the assisted flight control system and said first limited values received by a link 7 from the limiter 3; and
- means 8, in this particular instance a summer, for calculating second limited values corresponding to the sum of said first limited values received by the duplicated link 7 and of said damping values received by a link 9, and for transmitting the second limited values thus calculated, as second commands, to the summer 2 via the link e2A.

Thus, by virtue of the invention, said summer 8 superposes on the limited assistance control (first limited values), a supplement obtained from the difference between the overall assistance control (assistance values) and said limited assistance control (first limited values), which makes it possible to damp the transition of the control commands at the boundaries of the limit of authority generated by said limiter 3.

This damping is achieved according to the amplitude and, as will be seen hereinbelow, the dynamics of the assistance (assistance values) determined by the assisted flight control system.

In consequence, the present invention makes it possible, in the medium term (and to within the dynamics of said control supplement) to provide a solution to the problem of providing feedback regarding the proportion of axis control remaining, while at the same time improving the continuity and significance of the assistance at the boundaries of the limit of authority.

As can be seen in FIG. 2, said means 5, 6, in order to determine the damping values, comprise:
- a calculation means 5 for calculating the difference between said assistance values and said first limited values; and
- a filtering means 6 which is connected by a link 10 to said calculation means 5 and which filters this difference, in order to remove from it the low-frequency signals so as to obtain said damping values transmitted by the link 9 to the summer 8.

This filtering makes it possible to acknowledge the dynamic part of the control supplement.

The time constant of said filtering means 6 determines the importance of the damping on the limit of authority. This time constant may, in addition, vary dynamically, for example as a function of the difference transmitted by the link 10, so as to optimize a compromise between providing feedback regarding the proportion of axis control remaining and the significance of the assistance at the boundaries of the limit of authority.

Of course, the higher the time constant, the greater the damping. So, as far as the dynamic variation is concerned:
- if the difference transmitted by the link 10 is great (the assistance values significantly exceed their limitations), the pilot is no longer assisted in estimating the control margins. He must then quickly reduce (damp) this difference in order not to be too far off the limitations;
- by contrast, if this difference is sufficiently low, that is to say if the position is sufficiently far from the end stops, it can be let through without being filtered too quickly, in order to obtain better flight quality of the aircraft He, which explains the aforementioned compromise between:
  - on the one hand, the provision of feedback regarding the axis control proportion remaining, in instances where it is beneficial to have zero difference; and
  - on the other hand, the significance of the assistance, in instances where it is beneficial to have a difference which passes fully to the control.

It will be noted that when the aircraft He is equipped with an electrical flight control device CDVE, as depicted in FIG.

1, said assisted flight control system and said limitation system SL are preferably (although not exclusively) incorporated into said flight control device CDVE.

However, the present invention may also be applied, in an example which has not been depicted, to an aircraft fitted with an automatic pilot. In this case, said assisted flight control system preferably corresponds to said automatic pilot of the aircraft. In addition:

in a first embodiment not depicted, said first commands are generated by a transducer associated with said flight control and converting the movement of said flight control into an electrical signal; and in a second embodiment not depicted, said first commands are generated via a linkage and a jack which are associated with said flight control.

In consequence, even in the case of an automatic pilot, the associated flight control system has the aforementioned overall characteristics in accordance with the invention.

In one particular embodiment, said limiter 3 is formed in such a way as to limit the assistance values using continuous limitation functions, giving rise to minimum limitation when the flight control LCo, MCy or Pal considered is brought near to its central position, and maximum limitation when said flight control LCo, MCy or Pal is brought near to one of its extreme positions, as illustrated very diagrammatically at 11 in FIG. 2.

In addition, in order to optimize the effectiveness of the limit of authority, at least some of said limitation functions may have variable values depending on the value of parameters, such as the angular velocity of the helicopter He, for example, which can be measured on said helicopter He.

Of course, said limiter 3 may just as easily employ limitation functions which are entirely asymmetric and more generally variable, particularly according to the flight configuration of the helicopter He.

What is claimed is:

1. A flight control system for a rotary-wing aircraft generating control commands for controlling at least one rotor of said aircraft, said flight control system comprising in particular:

at least one flight control which can be moved by a pilot of said aircraft, first commands being representative of the position of said flight control;

an assisted flight control system generating assistance values representing second commands;

a limitation system associated with said assisted flight control system and comprising a limiter which is intended to limit said assistance values according to the position of said flight control, to first limited values; and first means for determining said control commands from the sum of said first and second commands, wherein said limitation system additionally comprises:

second means for determining damping values representative of the difference between said assistance values and said first limited values; and third means for calculating second limited values corresponding to the sum of said first limited values and of said damping values, and for transmitting the second limited values thus calculated as second commands to said first means.

2. The flight control system as claimed in claim 1, wherein said second means comprise:

a calculation means which calculates the difference between said assistance values and said first limited values; and a filtering means which filters this difference to remove the low-frequency signals from it so as to obtain said damping values.

3. The flight control system as claimed in claim 1, wherein said limiter is formed in such a way as to limit the assistance values, by continuous limitation functions, generating minimum limitation when said flight control is brought near to its central position, and maximum limitation when said flight control is brought near to one of its extreme positions.

4. The flight control system as claimed in claim 1, wherein said limiter is formed in such a way as to limit the assistance values, by limitation functions, at least some of which have variable values dependent on the value of parameters that can be measured on the aircraft.

5. The flight control system for an aircraft equipped with an automatic pilot as claimed in claim 1, wherein said assisted flight control system corresponds to said automatic pilot of the aircraft.

6. The flight control system as claimed in claim 5, wherein said first commands are generated by a transducer associated with said flight control and converting the movement of said flight control into an electrical signal.

7. The flight control system as claimed in claim 5, wherein said first commands are generated via a linkage and a jack which are associated with said flight control.

8. The flight control system for an aircraft equipped with a flight control device as claimed in claim 1, wherein said assisted flight control system and said limitation system are incorporated into said flight control device.

9. The flight control system as claimed in claim 1, wherein said filtering means has a dynamically-variable time constant.

* * * * *